US011565635B2

(12) United States Patent
Kosugi et al.

(10) Patent No.: US 11,565,635 B2
(45) Date of Patent: Jan. 31, 2023

(54) VEHICLE CONTROL DEVICE

(71) Applicant: KABUSHIKI KAISHA TOKAI RIKA DENKI SEISAKUSHO, Aichi (JP)

(72) Inventors: Masanori Kosugi, Aichi (JP); Tetsuya Egawa, Aichi (JP); Takashi Nagao, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 153 days.

(21) Appl. No.: 16/484,622

(22) PCT Filed: Jan. 31, 2018

(86) PCT No.: PCT/JP2018/003133
§ 371 (c)(1),
(2) Date: Aug. 8, 2019

(87) PCT Pub. No.: WO2018/150872
PCT Pub. Date: Aug. 23, 2018

(65) Prior Publication Data
US 2019/0366950 A1    Dec. 5, 2019

(30) Foreign Application Priority Data

Feb. 14, 2017  (JP) .............................. JP2017-025340

(51) Int. Cl.
*B60R 16/00*      (2006.01)
*B60R 16/023*    (2006.01)
(Continued)

(52) U.S. Cl.
CPC ............ *B60R 16/023* (2013.01); *B60K 28/06* (2013.01); *B60W 40/08* (2013.01); *B60W 50/10* (2013.01); *B60W 50/12* (2013.01); *B60W 50/14* (2013.01)

(58) Field of Classification Search
CPC ...... B60R 16/023; B60K 28/06; B60W 40/08; B60W 50/10; B60W 50/12; B60W 50/14
See application file for complete search history.

(56) References Cited

U.S. PATENT DOCUMENTS 8,954,238 B2     2/2015  Kobana et al.
2008/0211647 A1*  9/2008  Yamada .................. B60Q 9/00
                                            340/438

(Continued)

FOREIGN PATENT DOCUMENTS

JP    2008-213629 A    9/2008
JP    2012-171385 A    9/2012
(Continued)

OTHER PUBLICATIONS

International Search Report, dated Apr. 17, 2018, in International Application No. PCT/JP2018/003133.

*Primary Examiner* — Truc M Do
(74) *Attorney, Agent, or Firm* — Greenblum & Bernstein, P.L.C.

(57) ABSTRACT

A vehicle control device includes an actuation unit that actuates an anomaly control switch that acknowledges execution of safety control, which improves safety during driving of a vehicle, upon detection of an occupant in an anomalous state from a monitoring result of a state of the occupant of the vehicle. The actuation unit causes the anomaly control switch to be actuated to allow the occupant to recognize a control content of the safety control. The vehicle control device further includes an operation acknowledgement unit that acknowledges operation of the anomaly control switch and a controller that executes the safety control when the operation acknowledgement unit acknowledges the operation of the anomaly control switch.

6 Claims, 5 Drawing Sheets

(51) Int. Cl.
  *B60K 28/06* (2006.01)
  *B60W 40/08* (2012.01)
  *B60W 50/10* (2012.01)
  *B60W 50/12* (2012.01)
  *B60W 50/14* (2020.01)

(56) References Cited

U.S. PATENT DOCUMENTS

| | | | |
|---|---|---|---|
| 2012/0212353 A1* | 8/2012 | Fung | B60W 30/08 340/905 |
| 2014/0114536 A1* | 4/2014 | Kobana | B60K 28/06 701/1 |
| 2014/0121927 A1 | 5/2014 | Hanita | |
| 2015/0203126 A1 | 7/2015 | Kobana et al. | |
| 2017/0161576 A1* | 6/2017 | Banno | G08B 21/02 |

FOREIGN PATENT DOCUMENTS

| | | |
|---|---|---|
| JP | 5527411 B2 | 4/2014 |
| JP | 2015-153391 A | 8/2015 |
| WO | 2013/008300 A1 | 1/2013 |
| WO | 2014/016911 A1 | 1/2014 |
| WO | 2013/008301 A1 | 2/2015 |

* cited by examiner

VEHICLE CONTROL DEVICE

TECHNICAL FIELD

The present disclosure relates to a vehicle control device.

BACKGROUND

A typical driver anomaly management system automatically stops a vehicle when the driver cannot continue driving appropriately due to physical condition deterioration or the like while driving the vehicle (Patent Document 1).

Patent Document 1 describes an example of a driver anomaly management system that detects the physical condition of the driver based on the brain waves and heart rate of the driver and executes safety control (such as automatic stop control), which improves safety during the driving of the vehicle, if determining that the driver is in a state inappropriate for continuing driving.

If it is erroneously determined that the driver cannot appropriately continue driving even though the driver can continue driving appropriately, unnecessary safety control may be executed. Thus, even if the driver anomaly management system determines that the driver cannot continue driving appropriately, the driver anomaly management system does not start executing the safety control until the driver performs an operation permitting the execution of the safety control.

Patent Document 1: Japanese Patent No. 5527411

SUMMARY

In Patent Document 1, the driver anomaly management system determines whether or not the driver has performed an operation permitting execution of the safety control after determining that the driver is in a state inappropriate for continuing driving. However, a situation in which the driver anomaly management system executes the safety control seldom occurs. Thus, the driver may not be able to recognize the control content of the safety control even when the driver is informed to execute the safety control. Thus, the safety control may not be executed at a proper time as intended by the driver.

It is an objective of the present disclosure to provide a vehicle control device that executes safety control at a further proper time.

A vehicle control device according to one embodiment includes an actuation unit that actuates an anomaly control switch that acknowledges execution of safety control, which improves safety during driving of a vehicle, upon detection of an occupant in an anomalous state from a monitoring result of a state of the occupant of the vehicle, in which the actuation unit causes the anomaly control switch to be actuated to allow the occupant to recognize a control content of the safety control; an operation acknowledgement unit that acknowledges operation of the anomaly control switch; and a controller that executes the safety control when the operation acknowledgement unit acknowledges the operation of the anomaly control switch.

According to this configuration, when the anomalous state of the occupant is detected, the anomaly control switch is actuated so that the control content of the safety control is recognizable to the occupant. Because the occupant can operate the anomaly control switch at a further proper time, the safety control is executed at a further proper time.

In the above vehicle control device, preferably, the controller avoids execution of the safety control when the operation acknowledgement unit does not acknowledge the operation of the anomaly control switch.

According to this configuration, execution of the safety control is avoided when the occupant does not operate the anomaly control switch. This reduces inadvertent execution of the safety control so that the safety control is executed at a further proper time.

In the above vehicle control device, preferably, the actuation unit shows the anomaly control switch on a display device so that the control content of the safety control is recognizable to the occupant.

According to this configuration, the actuation unit visually shows the control content of the safety control on the display device so that the occupant can recognize the control content of the safety control in a further proper manner. This allows the occupant to operate the anomaly control switch at a further proper time.

In the above vehicle control device, preferably, the display device is a touch display.

According to this configuration, the display device is a touch display so that the occupant is visually notified of the control content of the safety control. This allows the occupant to operate the anomaly control switch at a further proper time.

In the above vehicle control device, preferably, the actuation unit shows the anomaly control switch together with the control content of the safety control in a display region of the touch display excluding a region showing a heater control panel.

According to this configuration, the anomaly control switch is shown on the touch display so that a physical anomaly control is unnecessary. This reduces the number of parts. Further, the location of the anomaly control switch may be easily recognized because the anomaly control switch is shown on the touch display even though the switch is seldom used. The anomaly control switch is shown in the region of the touch display excluding the heater control panel, thereby maximizing the region where the anomaly control switch is shown. This ensures the visibility of the anomaly control switch.

In the above vehicle control device, preferably, the controller executes aborting control that aborts execution of the safety control upon acknowledgement of an aborting operation for aborting execution of the safety control.

According to this configuration, the controller can abort execution of the safety control when the aborting operation by the driver is acknowledged even if the safety control is supposed to be executed when an operation of the anomaly control switch by the driver is acknowledged.

In the above vehicle control device, preferably, the controller executes the safety control when acknowledging a finalizing operation that finalizes execution of the safety control after the operation acknowledgement unit acknowledges operation of the anomaly control switch.

According to this configuration, the controller finalizes execution of the safety control when acknowledging a finalizing operation by the driver after acknowledging operation of the anomaly control switch by the driver.

In the above vehicle control device, preferably, when the operation of the anomaly control switch is not acknowledged by the operation acknowledgement unit, the controller performs an alternative operation notification that notifies the occupant that the safety control can be initiated through an alternative operation.

According to this configuration, the safety control is initiated based on different operations in accordance with the stages of the anomalous states of the driver. This supports initiation of the safety control in a further proper manner and executes the safety control at a further proper time as intended by the driver.

The vehicle control device according to the present disclosure executes safety control at a further proper time.

DESCRIPTION OF THE EMBODIMENTS

First Embodiment

A first embodiment of the vehicle control device will now be described.

Figure 1:
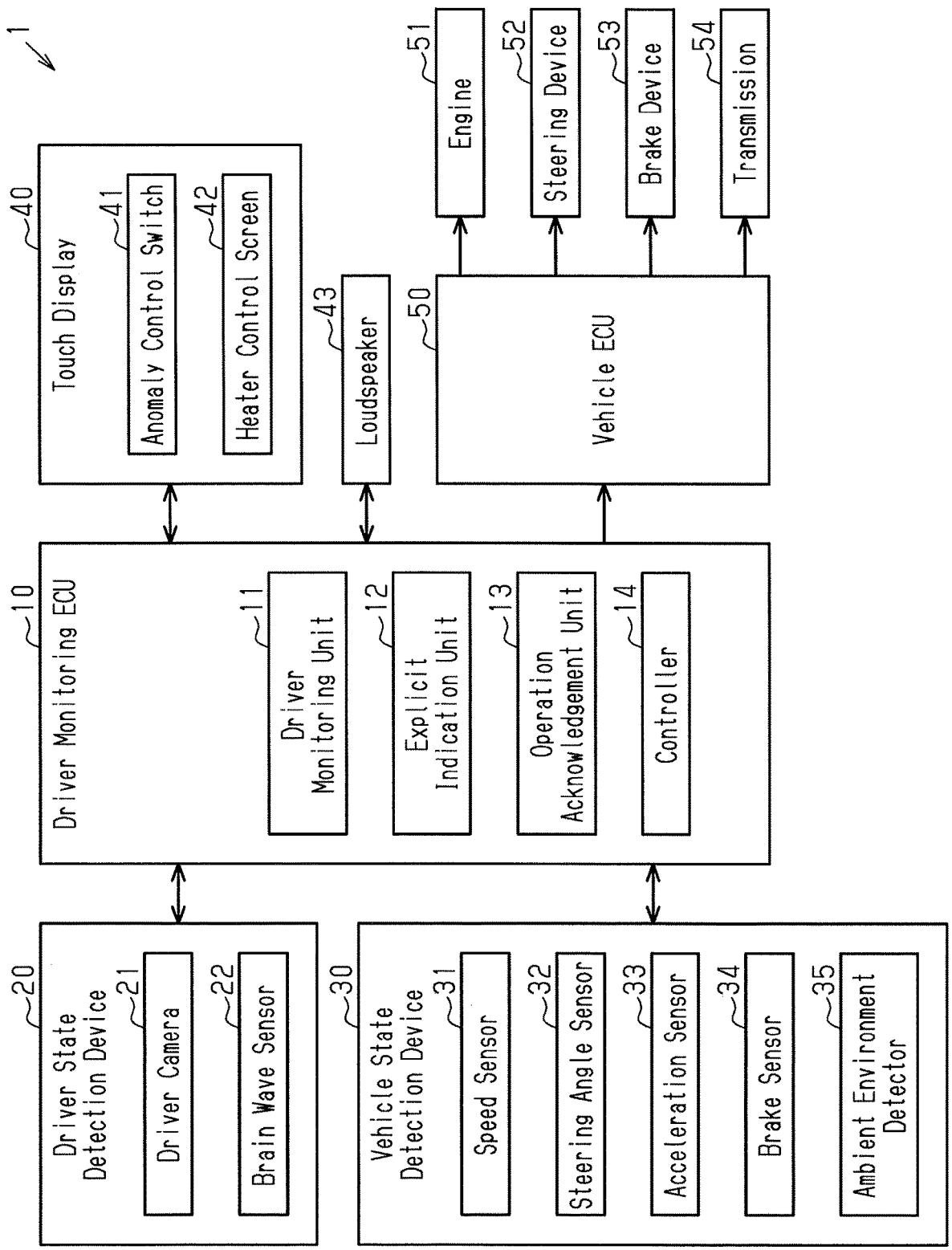
FIG. 1 is a diagram illustrating the configuration of a vehicle control device according to a first embodiment.

As illustrated in FIG. 1, a driver anomaly management system 1 includes a driver monitoring ECU 10 (vehicle control device), a driver state detection device 20, a vehicle state detection device 30, a touch display 40 (display device), a loudspeaker 43, and a vehicle ECU 50. The driver monitoring ECU 10 determines whether the driver (operator) is in a situation difficult for continuing driving of the vehicle based on information from the driver state detection device 20 and the vehicle state detection device 30. Then, the driver monitoring ECU 10 sends the determination result to the touch display 40 and the vehicle ECU 50. The vehicle ECU 50 executes safety control (anomalous situation vehicle control) such as automatic stop control that stops the vehicle at a safe location when the driver is in a situation difficult for continuing driving of the vehicle. The safety control improves safety during the driving of the vehicle and includes vehicle control that automatically parks or stops the vehicle at a safe location. The safety control also includes notification control that urges the driver to stop driving.

The driver state detection device 20 includes a driver camera 21 and a brain wave sensor 22. The driver camera 21 captures images of the driver to detect the physical condition (anomalous state) of the driver. The driver camera 21 captures images of the driver seated on the driver seat in real time by capturing images of, for example, the surroundings of the driver seat. The brain wave sensor 22 detects the brain waves of the driver in real time.

The vehicle state detection device 30 includes a speed sensor 31, a steering angle sensor 32, an acceleration sensor 33, a brake sensor 34, and an ambient environment detector 35. The speed sensor 31 detects the vehicle speed that is the traveling speed of the vehicle. The steering angle sensor 32 detects the steering angle of the steering wheel. The acceleration sensor 33 detects an operation amount (accelerator open degree) of the accelerator pedal. The brake sensor 34 detects an operation amount of the brake pedal. The ambient environment detector 35 detects objects around the vehicle and lane line information of the road. The ambient environment detector 35 employs, for example, a camera that captures images of the front and rear of the vehicle. The ambient environment detector 35 may employ an ultrasonic sensor or a laser radar instead of the camera.

Figure 2:
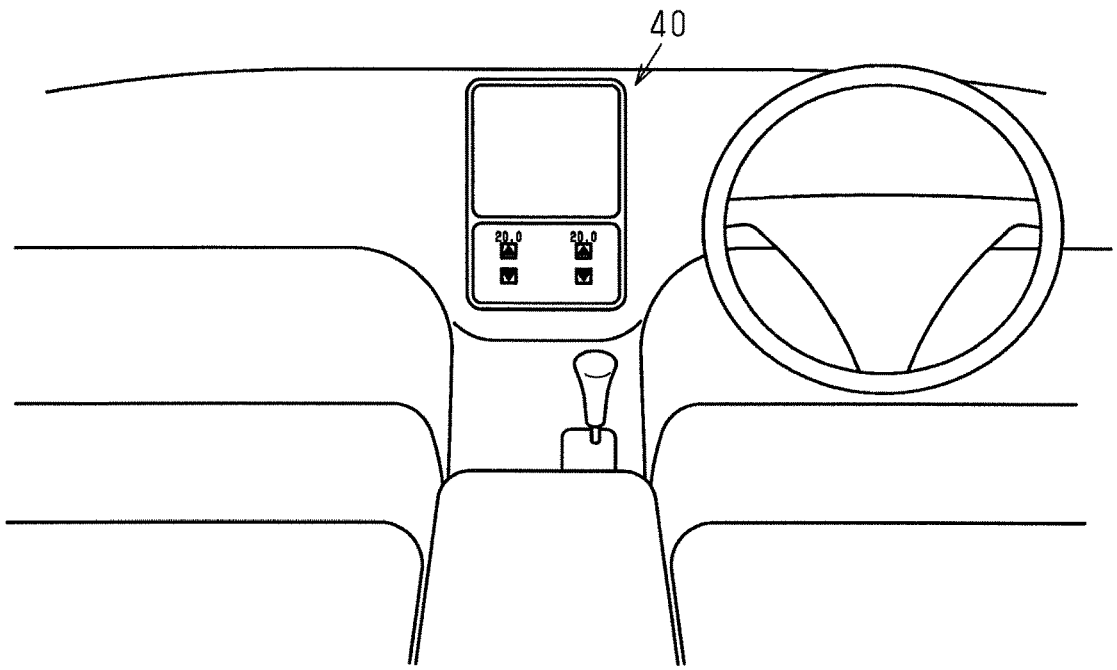
FIG. 2 is a perspective view illustrating the structure of a touch display, which is installed in a vehicle, of the vehicle control device according to the first embodiment.
Figure 4:
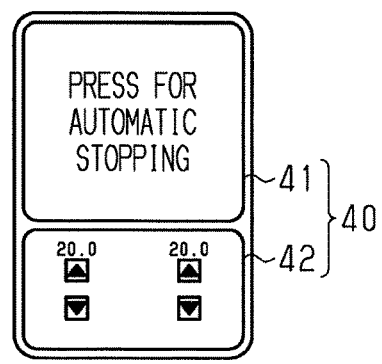
FIG. 4 is a schematic diagram illustrating a display of the touch display under an anomalous situation in the vehicle control device according to the first embodiment.

As illustrated in FIG. 2, the touch display 40 is arranged in the instrument panel of the vehicle. As illustrated in FIG. 4, the touch display 40 is configured to show at least an anomaly control switch 41 and a heater control screen 42. For example, the heater control screen 42 is always shown when the vehicle is powered on.

The anomaly control switch 41 is shown explicitly on the touch display 40 if a determination result of the driver monitoring ECU 10 indicates that it will be difficult for the driver to continue driving (anomalous situation). When the anomaly control switch 41 shown on the touch display 40 is operated, safety control is executed. In contrast, the anomaly control switch 41 is not shown on the touch display 40 in a normal situation (if determined that driver is able to continue driving). During a normal situation, for example, a map of a car navigation system (navigation) and the like is shown on the touch display 40.

The heater control screen 42 is shown to allow for adjustment of the actuation state of an air conditioner installed in the vehicle body. The heater control screen 42 shows switches that can be touched and operated by the driver. The driver can adjust the set temperature, the airflow, and the discharge direction of the air conditioner by touching (pressing) the switches in the heater control screen 42.

As illustrated in FIG. 1, the driver monitoring ECU 10 is connected to the loudspeaker 43. The driver monitoring ECU 10 notifies (warns) the driver with the loudspeaker 43 that safety control can be executed if it is determined that the driver is in an anomalous state.

The vehicle ECU 50 is connected to the driver monitoring ECU 10. The vehicle ECU 50 is also connected to an engine 51, a steering device 52, a brake device 53, and a transmission 54. The vehicle ECU 50 controls the behavior of the vehicle by executing safety control if the driver operates the anomaly control switch 41 in a case in which the driver monitoring ECU 10 determines that the driver is in a state difficult for continuing driving of the vehicle.

The vehicle ECU 50 performs automatic stop by controlling, for example, the engine 51, the steering device 52, the brake device 53, and the transmission 54.

The configuration of the driver monitoring ECU 10 will now be described.

The driver monitoring ECU 10 includes a driver monitoring unit 11, an explicit indication unit 12, an operation acknowledgement unit 13, and a controller 14.

The driver monitoring unit 11 monitors the physical condition of the driver in real time based on images of the driver captured by the driver camera 21 and brain waves obtained by the brain wave sensor 22. An anomalous physical condition of the driver, such as when the driver feels drowsy while driving or when the consciousness level of the driver is decreased, can be detected based on the open degree of the eyelids and irregular brain waves of the driver. If the driver monitoring unit 11 determines that it will be difficult for the driver to continue driving the vehicle, the driver monitoring unit 11 transmits the determination result to the explicit indication unit 12.

When the explicit indication unit 12 (actuation unit) receives the determination result from the driver monitoring unit 11 indicating that it will be difficult for the driver to continue driving the vehicle, the explicit indication unit 12 actuates the anomaly control switch 41, which acknowledges execution of safety control, in a manner allowing an occupant such as the driver to recognize the control content of the safety control. In the first embodiment that uses, for example, the touch display 40, the explicit indication unit 12 (explicitly) shows the anomaly control switch 41 on the touch display 40 by transmitting a control signal to the touch display 40 so that the driver can recognize the control content of the safety control. In the first embodiment, the occupant as well as the driver can recognize the control content of the safety control.

The operation acknowledgement unit 13 detects a touch operation performed by the driver on the touch display 40. Thus, the operation acknowledgement unit 13 also detects that the driver touches and operates the anomaly control switch 41 shown on the touch display 40. That is, the operation acknowledgement unit 13 acknowledges the operation of the anomaly control switch 41 performed by the driver. When the anomaly control switch 41 is touched and operated by the driver, the anomaly control switch 41 notifies the controller 14 of the touch operation.

After the anomaly control switch 41 is shown on the touch display 40, if the anomaly control switch 41 is touched and operated, the controller 14 transmits a control signal to the vehicle ECU 50 to execute safety control. When the controller 14 is notified that the anomaly control switch 41 has been touched and operated from the operation acknowledgement unit 13 after the anomaly control switch 41 is shown, the controller 14 executes the safety control. That is, when the operation acknowledgement unit 13 acknowledges the operation of the anomaly control switch 41, the controller 14 executes the safety control. In contrast, if the anomaly control switch 41 is not touched and operated, the controller 14 does not execute the safety control.

The touch display 40 will now be described in detail.

Figure 3:
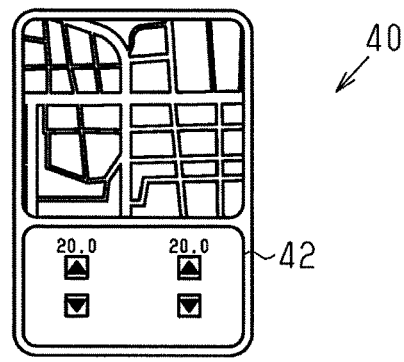
FIG. 3 is a schematic diagram illustrating a display of the touch display under a normal situation in the vehicle control device according to the first embodiment.

As illustrated in FIG. 3, during a normal situation, a navigation map and the heater control screen 42, for example, are shown on the touch display 40. The heater control screen 42 is always shown in a certain field when the vehicle is powered on as regulated by the law.

As illustrated in FIG. 4, during an anomalous situation, in addition to the heater control screen 42, the anomaly control switch 41 is (explicitly) shown on the touch display 40 so that the driver can recognize the control content of safety control. The anomaly control switch 41 may, for example, replace the map and be shown using most of the region excluding the heater control screen 42 in the touch display 40. In the first embodiment, the anomaly control switch 41 is shown as being larger than the heater control screen 42. In an anomalous situation, the heater control screen 42 is shown even when the anomaly control switch 41 is shown on the touch display 40. The anomaly control switch 41 is shown so that the driver can clearly understand the meaning of the anomaly control switch 41, that is, the control content of the safety control. Characters describing the control content of the safety control such as "PRESS FOR AUTOMATIC STOPPING" may be shown in a display area of the anomaly control switch 41.

The procedure of the control executed by the driver monitoring ECU 10 will now be described.

Figure 5:
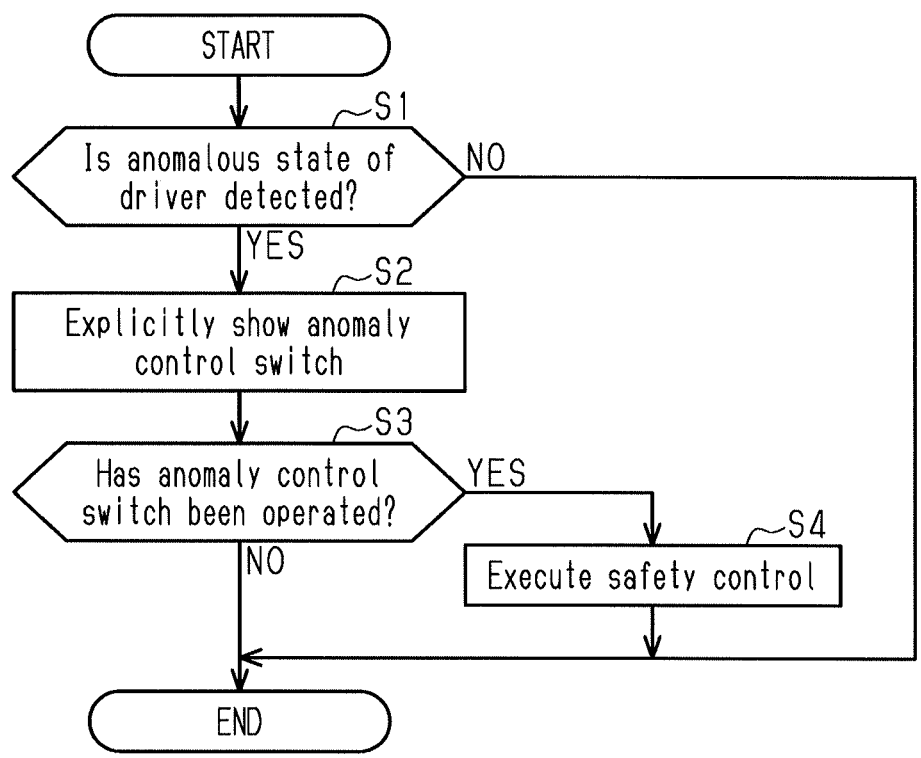
FIG. 5 is a flowchart illustrating a process for initiating safety control in the vehicle control device according to the first embodiment.

As illustrated in the flowchart of FIG. 5, the driver monitoring ECU 10 determines whether an anomalous state of the driver has been detected (step S1).

If the driver monitoring ECU 10 does not detect an anomalous state of the driver (NO in step S1), the driver monitoring ECU 10 ends the process.

If the driver monitoring ECU 10 detects an anomalous state of the driver (YES in step S1), the driver monitoring ECU 10 explicitly shows the anomaly control switch 41 on the touch display 40 (step S2).

Then, the driver monitoring ECU 10 determines whether the anomaly control switch 41 has been operated within a predetermined time (step S3).

If the anomaly control switch 41 has not been operated (NO in step S3), the driver monitoring ECU 10 ends the process.

In contrast, if the anomaly control switch 41 has been operated (YES in step S3), the driver monitoring ECU 10 starts executing safety control (step S4). This ends the process. The safety control includes automatic stopping control or the like. In other words, even if an anomalous state of the driver is detected, the safety control will not be executed unless the driver touches and operates the anomaly control switch 41. This avoids execution of the safety control if the driver intends to continue driving.

The first embodiment has the advantages described below.

(1) If the driver monitoring ECU 10 detects an anomalous state of the driver, the anomaly control switch 41 is shown on the touch display 40 so that the driver can recognize the control content of safety control. The anomaly control switch 41 is shown to allow the driver to understand the meaning of the anomaly control switch 41 when looking at it. This allows the driver to operate the anomaly control switch 41 in a more ensured manner. In particular, since a situation where the anomaly control switch 41 is shown and the safety control needs to be executed seldom occurs, it is meaningful that the driver will be able to recognize the control content of the safety control when looking at the anomaly control switch 41.

When the driver monitoring ECU 10 detects an anomalous state of the driver, the driver can recognize the control content of the safety control. The driver can touch and operate the anomaly control switch 41 at an appropriate time so that the safety control is executed at a further proper time.

(2) The anomaly control switch 41 is shown using most of the touch display 40 excluding the heater control screen 42 to improve the visibility of the anomaly control switch 41. This allows the driver to comprehend the location of the anomaly control switch 41 more easily.

(3) The area of the anomaly control switch 41 may show characters such as "PRESS FOR AUTOMATIC STOPPING" to allow for understanding of the control content of the safety control, which will be executed by operating the anomaly control switch 41. In a comparative example, an icon represents the anomaly control switch 41. If the driver does not know the meaning of the icon, the driver will not be able to understand the meaning of the anomaly control switch 41. Since a situation where the anomaly control switch 41 is shown seldom occurs, the driver may not be aware that the anomaly control switch 41 exists until it is actually shown. In contrast, in the first embodiment, the characters show the anomaly control switch 41 so that the driver can easily understand the meaning of the anomaly control switch 41 even if the driver is not aware that the anomaly control switch 41 exists. Thus, the safety control is executed at a further proper time as intended by the driver.

(4) The border between the anomaly control switch 41 and the portion other than the anomaly control switch 41 is clear. That is, the touch display 40 excluding the heater control screen 42 entirely shows the anomaly control switch 41.

This allows the driver and other occupants to easily comprehend the location of the anomaly control switch 41.

Second Embodiment

A vehicle control device according to a second embodiment will now be described. The description will focus on differences from the first embodiment.

The anomaly control switch 41 in the second embodiment is configured to acknowledge an aborting operation for aborting execution of the safety control even if the anomaly control switch 41 acknowledges execution of the safety control when touched and operated by the driver.

In the first embodiment, the safety control illustrated in FIG. 4 is initiated when the anomaly control switch 41 is touched and operated. However, the driver or other occupants may inadvertently touch and operate the anomaly control switch 41. Thus, even when the anomaly control switch 41 is touched and operated, it is preferable that execution of the safety control be canceled, more specifically, an aborting operation for aborting execution of the safety control be acknowledged. The aborting operation may be, for example, a press-and-hold operation, a double-tapping operation, or the like performed on the anomaly control switch 41. That is, the aborting operation differs from, for example, a touch operation (operation for acknowledging execution of safety control) of the anomaly control switch 41 or an operation performed on an in-vehicle device that differs from the anomaly control switch 41. In the second embodiment, even if the anomaly control switch 41 is touched and operated, the controller 14 executes aborting control that aborts (cancels) execution of the safety control upon acknowledgement of the aborting operation.

The procedure for performing a process executed by the driver monitoring ECU 10 will now be described.

Figure 6:
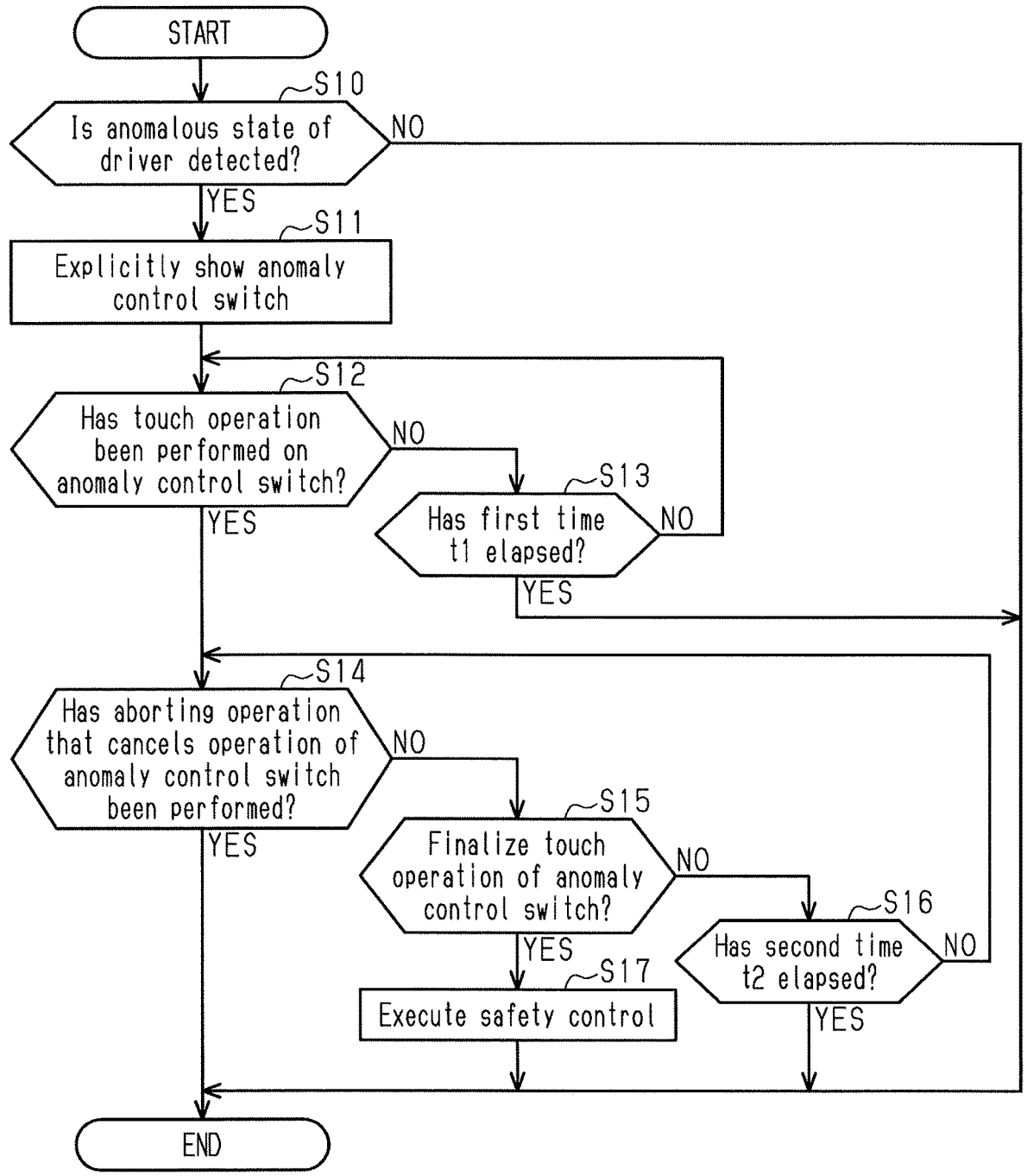
FIG. 6 is a flowchart illustrating a process for initiating safety control in the vehicle control device according to a second embodiment.

As illustrated in FIG. 6, the driver monitoring ECU 10 determines whether an anomalous state of the driver has been detected (step S10).

If the driver monitoring ECU 10 does not detect an anomalous state of the driver (NO in step S10), the driver monitoring ECU 10 ends the process.

If the driver monitoring ECU 10 detects an anomalous state of the driver (YES in step S10), the driver monitoring ECU 10 explicitly shows the anomaly control switch 41 on the touch display 40 (step S11).

Then, the driver monitoring ECU 10 determines whether a touch operation has been performed on the anomaly control switch 41 (step S12).

If a touch operation has not been performed on the anomaly control switch 41 (NO in step S12), the driver monitoring ECU 10 determines whether a first time t1 has elapsed (step S13). The first time t1 is an elapsed time from when the anomaly control switch 41 is explicitly shown.

If the first time t1 has not elapsed (NO in step S13), the driver monitoring ECU 10 determines again whether a touch operation has been performed on the anomaly control switch 41 (step S12).

In contrast, if the first time t1 has elapsed (YES in step S13), the driver monitoring ECU 10 ends the process.

If the touch operation has been performed on the anomaly control switch 41 (YES in step S12), the driver monitoring ECU 10 determines whether an aborting operation has been performed to cancel the touch operation of the anomaly control switch 41 (step S14).

If the aborting operation, which cancels the touch operation of the anomaly control switch 41, has not been performed (NO in step S14), the driver monitoring ECU 10 determines whether to finalize the touch operation of the anomaly control switch 41 (step S15). Examples of a finalizing operation, which finalizes the touch operation of the anomaly control switch 41, include an operation that differs from the first operation performed on the anomaly control switch 41 to acknowledge execution of the safety control and an operation performed on an in-vehicle device (such as a brake) that differs from the anomaly control switch 41. The finalizing operation, which finalizes the touch operation, differs from the aborting operation.

If the touch operation of the anomaly control switch 41 has not been finalized (NO in step S15), the driver monitoring ECU 10 determines whether a second time t2 has elapsed (step S16). The second time t2 is an elapsed time from when a touch operation is performed on the anomaly control switch 41 (YES in step S12) used to determine whether an aborting operation has been performed to cancel the touch operation of the anomaly control switch 41. The first time t1 may be set to be longer than or equal to the second time t2.

If the second time t2 has not elapsed (NO in step S16), the driver monitoring ECU 10 determines again whether an aborting operation has been performed to cancel the touch operation of the anomaly control switch 41 (step S14).

In contrast, if the second time t2 has elapsed (YES in step S16), the driver monitoring ECU 10 ends the process.

If the touch operation of the anomaly control switch 41 is finalized (YES in step S15), the driver monitoring ECU 10 executes the safety control (step S17) and ends the process. The safety control includes automatic stopping control or the like.

If an aborting operation has been performed to cancel the touch operation of the anomaly control switch 41 (YES in step S14), the driver monitoring ECU 10 ends the process. In other words, even if a touch operation is performed on the anomaly control switch 41, initiation of the safety control can be cancelled when an aborting operation (operation that cancels touch operation) is performed. Thus, the driver monitoring ECU 10 ends the process without executing the safety control.

The second embodiment has the advantages described below.

(1) If the monitoring ECU 10 detects an anomalous state of the driver, the driver monitoring ECU 10 explicitly shows the anomaly control switch 41 on the touch display 40. The anomaly control switch 41 is touched and operated by the driver to start executing safety control. Thus, the safety control is executed at a further proper time as intended by the driver.

(2) The anomaly control switch 41 of the second embodiment is explicitly shown if an anomalous state of the driver is detected. This allows the driver to operate the anomaly control switch 41. The anomaly control switch 41 is not shown if the anomalous state of the driver is not detected. This avoids execution of the safety control that would be caused by an inadvertent touch operation of the anomaly control switch 41 when the driver is not in an anomalous state. Thus, the safety control is executed at a further proper time as intended by the driver.

(3) Even after the driver operates the anomaly control switch 41, initiation of the safety control is cancelled if the driver performs the aborting operation to cancel the touch operation of the anomaly control switch 41. Thus, even when a touch operation is inadvertently performed on the anomaly control switch 41, the driver can cancel initiation of the safety control so that the safety control is executed at a further proper time.

Third Embodiment

A vehicle control device according to a third embodiment will now be described. The description will focus on differences from the first embodiment.

In the third embodiment, in addition to executing the safety control upon acknowledgement of the touch operation of the anomaly control switch 41, the controller 14 of the driver monitoring ECU 10 executes safety control upon acknowledgement of a brake operation (alternative operation) even in a case in which the touch operation of the anomaly control switch 41 is not acknowledged. In an initial stage when an anomalous state of the driver is detected, execution of the safety control is acknowledged through a touch operation of the anomaly control switch 41. In a latter stage when an anomalous state of the driver is detected, the probability of the driver being in an anomalous state increases. Thus, execution of the safety control is acknowledged through a brake operation, which is an easier operation. Thus, in the third embodiment, if operation of the anomaly control switch 41 is not acknowledged, the controller 14 performs an alternative operation notification to notify the occupant that the safety control can be initiated through an alternative operation. The alternative operation notification may be issued using voice or display.

Figure 7:
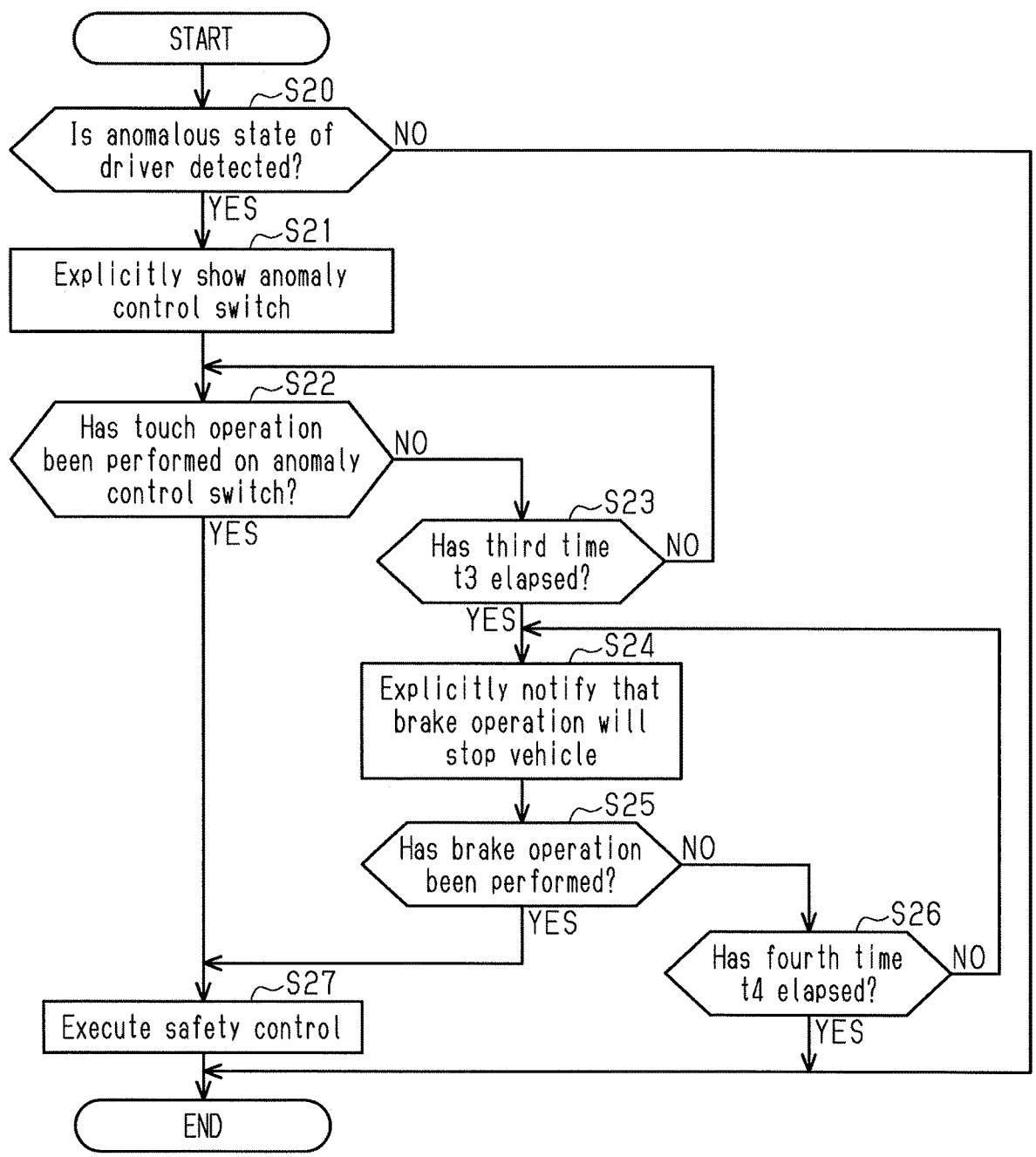
FIG. 7 is a flowchart illustrating a process for initiating safety control in the vehicle control device according to a third embodiment.

As illustrated in FIG. 7, the driver monitoring ECU 10 determines whether an anomalous state of the driver has been detected (step S20).

If the driver monitoring ECU 10 does not detect an anomalous state of the driver (NO in step S20), the driver monitoring ECU 10 ends the process.

If the driver monitoring ECU 10 detects an anomalous state of the driver (YES in step S20), the driver monitoring ECU 10 explicitly shows the anomaly control switch 41 on the touch display 40 (step S21).

Then, the driver monitoring ECU 10 determines whether a touch operation has been performed on the anomaly control switch 41 (step S22).

If a touch operation has been performed on the anomaly control switch 41 (YES in step S22), the driver monitoring ECU 10 executes safety control (step S27). Specifically, if a touch operation has been performed on the anomaly control switch 41 when an anomalous state of the driver is detected, the controller 14 executes the safety control.

In contrast, if an operation has not been performed on the anomaly control switch 41 (NO in step S22), the driver monitoring ECU 10 determines whether a third time t3 has elapsed (step S23). The third time t3 is an elapsed time from when the anomaly control switch 41 is explicitly shown.

If the third time t3 has not elapsed (NO in step S23), the driver monitoring ECU 10 determines again whether a touch operation has been performed on the anomaly control switch 41 (step S22).

If the third time t3 has elapsed (YES in step S23), the driver monitoring ECU 10 issues an explicit notification indicating that a brake operation will stop the vehicle (step S24) and determines whether a brake operation has been performed (step S25).

If a brake operation has been performed (YES in step S25), the driver monitoring ECU 10 executes safety control (step S27). The safety control is executed because the brake operation is performed when a touch operation is not performed on the anomaly control switch 41.

If a brake operation has not been performed (NO in step S25), the driver monitoring ECU 10 determines whether a fourth time t4 has elapsed (step S26). The fourth time t4 is an elapsed time from when an explicit notification is issued to indicate that the brake operation will stop the vehicle and used to determine whether the brake operation has been performed. The fourth time t4 is set to be shorter than the third time t3. The fourth time t4 may be set to be longer than or equal to the third time t3.

If the fourth time t4 has not elapsed (NO in step S26), the driver monitoring ECU 10 issues an explicit notification again indicating that the brake operation will stop the vehicle (step S24). The driver monitoring ECU 10 may notify the contents of step S24 again or continue the notification of step S24 until the fourth time t4 has elapsed.

During the fourth time t4 (YES in step S26), the driver monitoring ECU 10 executes the safety control (step S27) and then ends the process.

The third embodiment has the advantages described below.

(1) The driver monitoring ECU 10 requests the driver to perform an operation for executing safety control in accordance with an anomalous state stage of the driver. Specifically, the operation for executing the safety control differs between an initial stage after an anomalous state of the driver is detected and a latter stage after the anomalous state of the driver is detected. By setting a different operation for each stage, the safety control can be executed through different ways (such as brake operation) even if, for example, the anomaly control switch 41 cannot be operated. Thus, the safety control is executed at a further proper time.

The above described embodiments may be modified as follows. The following modifications can be combined as long as the combined modifications remain technically consistent with each other.

The operation acknowledgement unit 13 may detect an operation performed on the touch display 40 by an occupant seated on, for example, the passenger seat, in addition to an operation performed on the touch display 40 by the driver.

In the embodiments, the driver monitoring unit 11 detects the anomalous state of the driver based on the open degree of the eyelids and irregular brain waves of the driver. Instead, the driver monitoring unit 11 may detect the anomalous state of the driver based on heart rate, perspiration amount, blood pressure, muscular relaxation, blinking frequency of the driver, inclination of the head of the driver relative to the body, whether the driver has lost consciousness, and the like. Thus, the driver state detection device 20 may include a heart rate detection sensor and a perspiration amount detection sensor in addition to the driver camera 21 and the brain wave sensor 22. The driver camera 21 and the brain wave sensor 22 may be replaced with other sensors that detect the anomalous state of the driver.

In each embodiment, the touch display 40 is installed in the instrument panel of the vehicle. Instead, the touch display 40 may be arranged in any manner as long as it is located near the driver such as a head-up display. In the case of the head-up display, a portion where the anomaly control switch 41 is shown is separated from a portion on which a touch operation of the anomaly control switch 41 is performed. However, even in this case, it is preferred that the portion where the anomaly control switch 41 is shown explicitly indicate the portion of the anomaly control switch 41 that is touched.

In each embodiment, the vehicle ECU 50 may be connected to a shift device or the like.

In each embodiment, the vehicle state detection device 30 includes the speed sensor 31, the steering angle sensor 32, the acceleration sensor 33, the brake sensor 34, and the ambient environment detector 35. Instead, the vehicle state detection device 30 may include, for example, an acceleration sensor or a yaw rate sensor. The vehicle state detection device 30 may also include other sensors to detect the state of the vehicle instead of the speed sensor 31, the steering angle sensor 32, the acceleration sensor 33, the brake sensor 34, and the ambient environment detector 35.

In each embodiment, the heater control screen 42 is shown on the touch display 40. Instead, the heater control screen 42 may be replaced by a physical heater control switch.

Examples of safety control that can be executed in lieu of the automatic stopping control include pull-over control that pulls over the vehicle to a safe location and deceleration control. In addition to notifying the driver, it is preferred that other vehicles traveling nearby and pedestrians be notified of the anomaly occurring in the vehicle and that a rear vehicle may be notified when stopping (decelerating) by activating the hazard lights.

In the first embodiment, the determination of whether the anomaly control switch 41 is operated in step S3 of FIG. 5 may be based on whether the operation is performed within a certain period of time after the anomaly control switch 41 is explicitly shown.

In the first embodiment, the display area of the anomaly control switch 41 displays "PRESS FOR AUTOMATIC STOPPING." Instead, the display area of the anomaly control switch 41 may display, for example, "YOU HAVE BEEN DRIVING FOR A LONG TIME. ARE YOU ALL RIGHT?" to check whether the driver is in a good physical condition. Further, if the driver monitoring ECU 10 detects a poor physical condition of the driver, the display area of the anomaly control switch 41 may show a message suggesting the driver to stop the vehicle and rest.

In each embodiment, the anomaly control switch 41 may show a mark that represents a function and is recognized by many people.

In the second embodiment, a touch operation performed on the anomaly control switch 41 is finalized in step S15 of FIG. 6. However, the determination of step S15 does not necessarily have to be performed.

In the second embodiment, the determinations based on the first time t1 and the second time t2 are not necessary.

In the third embodiment, the determinations based on the third time t3 and the fourth time t4 are not necessary.

In the third embodiment, safety control is executed in FIG. 7 not only when an operation of the anomaly control switch 41 is acknowledged but also when a brake operation is acknowledged. However, instead of a brake operation, another alternative operation may be acknowledged. For example, safety control may be executed when acknowledging other operations such as the vehicle speed being reduced to a certain vehicle speed or lower or a shift operation being performed.

In each embodiment, a touch operation is performed on the anomaly control switch 41. Instead, a tap operation or a flip operation may be performed.

Preferably, before initiating safety control, the driver is notified of the initiation. This is because a passenger of the vehicle may be tampering with the anomaly control switch 41 thereby initiating the safety control.

In each embodiment, the anomaly control switch 41 is shown on the touch display 40. Instead, the anomaly control switch 41 may be formed by a physical switch showing characters on the surface of the switch with backlight. That is, the anomaly control switch 41 may be formed by a physical switch other than the touch display 40 as long as the anomaly control switch 41 can be explicitly shown.

In FIG. 1, the functions of the driver monitoring ECU 10 (vehicle control device) are divided into functions (11 to 14) in order to facilitate and exemplify description. These functions may be integrated or further divided.

In each embodiment, the driver monitoring ECU 10 (vehicle control device) may include one or more dedicated circuits or one or more processors. The driver monitoring ECU 10 may include, one or more processors and a memory (non-transitory computer-readable storage medium) that stores one or more programs including a group of instructions executable by the processor. The group of instructions, when executed, causes the processor to perform a method (any one of the methods described with reference to, for example, FIGS. 5 to 7) that starts safety control according to the present disclosure. In the first embodiment, the program includes a group of instructions that causes the processor to perform the process in steps S1 to S4 illustrated in FIG. 5. In the second embodiment, the program includes a group of instructions that causes the processor to perform the process in steps S10 to S17 illustrated in FIG. 6. In the third embodiment, the program includes a group of instructions that causes the processor to perform the process in steps S20 to S27 illustrated in FIG. 7. Accordingly, the present disclosure may provide a norm-transitory computer-readable storage medium that stores such a program.

What is claimed is:

1. A vehicle control device, comprising:
an actuation unit that actuates an anomaly control switch that acknowledges execution of safety control, which improves safety during driving of a vehicle, upon detection of an occupant in an anomalous state from a monitoring result of a state of the occupant of the vehicle, wherein the actuation unit causes the anomaly control switch to be actuated to allow the occupant to recognize a control content of the safety control;
an operation acknowledgement unit that acknowledges operation of the anomaly control switch; and
a controller that executes the safety control when acknowledging a finalizing operation performed by the occupant to finalize execution of the safety control after the operation acknowledgement unit acknowledges the operation of the anomaly control switch performed by the occupant,
wherein when the controller detects the anomalous state of the occupant, the controller explicitly shows the anomaly control switch on a display device and requests the occupant to perform a first operation for initiating the safety control, the first operation corresponding to the operation of the anomaly control switch, and
wherein when the operation of the anomaly control switch has not been performed by the occupant for a predetermined time, the controller requests the occupant to perform a second operation for initiating the safety control while performing an alternative operation notification that notifies the occupant that the safety control can be initiated through the second operation instead of the operation of the anomaly control switch.

2. The vehicle control device according to claim 1, wherein the controller avoids execution of the safety control when the operation acknowledgement unit does not acknowledge the operation of the anomaly control switch.

3. The vehicle control device according to claim 1, wherein the actuation unit shows the anomaly control switch on the display device so that the control content of the safety control is recognizable to the occupant.

4. The vehicle control device according to claim 3, wherein the display device is a touch display.

5. The vehicle control device according to claim 4, wherein the actuation unit shows the anomaly control switch together with the control content of the safety control in a display region of the touch display excluding a region showing a heater control screen.

6. The vehicle control device according to claim 1, wherein the controller executes aborting control that aborts execution of the safety control upon acknowledgement of an aborting operation for aborting execution of the safety control.

* * * * *